United States Patent [19]

Leznoff

[11] Patent Number: 4,758,623

[45] Date of Patent: Jul. 19, 1988

[54] TRIFLUOROACETYLATION OF UNHINDERED PRIMARY AND SECONDARY AMINES AND POLYMER-BOUND TRIFLUOROACETYLATION REAGENTS

[75] Inventor: Clifford C. Leznoff, North York, Canada

[73] Assignee: Schering Corporation, Kenilworth, N.J.

[21] Appl. No.: 887,666

[22] Filed: Jul. 17, 1986

[51] Int. Cl.$^4$ .................................................. C08F 8/32
[52] U.S. Cl. ............................... 525/54.11; 525/54.1; 525/333.5; 536/22
[58] Field of Search .................... 525/54.11, 54.1, 379, 525/380; 536/22; 562/574

[56] References Cited

U.S. PATENT DOCUMENTS 3,985,723 10/1976 Panetta .......................... 260/112.5 R

OTHER PUBLICATIONS

Schallenberg, E. et al., "Ethyl Thiotrifluoroacetate as an Acetylating Agent", vol. 77 (1955), pp. 2779 to 2783.
Hodge, et al., (ed) Polymer Supported Reactions in Organic Synthesis, (1980), pp. 136 to 139.
Bayer, E. et al., J. Am. Chem. Soc. 94:1 (1972), pp. 265 to 268.
Hauptschein, M. et al., "Thiolesters of Perfluorocarboxylic Acids", vol. 74, (1952), pp. 4005 to 4010.
Mohanraj and Ford, J., Org. Chem., vol. 50 No. 10 (1985), pp. 1617 to 1620.
Crowley, J. et al., Accounts of Chem. Res. vol. 9 (1976), pp. 135 to 144.
Dixit, et al., Israel J. Chem. vol. 17 (1978), pp. 248 to 252.
Frechet, J. M. J., Tetrahedron Reports, vol. 37, No. 103 (1981), pp. 663 to 683.
Farrall, M. J. et al., J. Org. Chem., vol. 41, No. 24 (1976), pp. 3877 to 3882.
Chiu, Shuet–Hing Lee, et al., Carb. Res. 50 (1976), pp. 227–238.

Primary Examiner—Christopher Henderson
Attorney, Agent, or Firm—Richard C. Billups; James R. Nelson; Stephen I. Miller

[57] ABSTRACT

A trifluoroacetylthio- or trifluoroacetylthioalkyl-substituted divinyl benzene co-styrene polymer and a method for using such polymer are disclosed.

10 Claims, No Drawings

TRIFLUOROACETYLATION OF UNHINDERED PRIMARY AND SECONDARY AMINES AND POLYMER-BOUND TRIFLUOROACETYLATION REAGENTS

BACKGROUND OF THE INVENTION

Trifluoroacetylation of amino acids and amines has been used as a method of protecting the amino group in chemical reactions. For example, trifluoroacetic anhydride has been used as a trifluoroacetylation reagent of amino acids. However, this reagent has been found to have the following drawbacks: (1) its high reactivity limited its use, (2) it has some unfavorable solubility characteristics, (3) the formation of unsymmetrical anhydrides occurs, and (4) racemization of chiral centers occurs.

The S-ethyl trifluorothioacetate reagent disclosed in Schallenberg et al., *J. Am. Chem. Soc.* 1955, 77, 2779, and in Hauptschein, M., Stokes, C. S., Nodiff, E. A. *J. Am. Chem. Soc.* 1952, 74, 4005 overcame all of these disadvantages. However, it introduced a new drawback, the formation of a disagreeable odoriferous by-product.

Alkyl trifluoroacetates have also been used as trifluoroacetylation reagents as disclosed in, for example, Bayer et al., *J. Am. Chem. Soc.* 1972, 94, 265. The alkyl trifluoroacetates, however, are used in excess and are sensitive to hydrolysis, resulting in deterioration during handling and storage.

Solid phase synthesis and the use of polymer supported reactions in organic synthesis has been explored in the prior art. See, for example, *Polymer-supported Reactions in Organic Synthesis* (P. Hodge and D. C. Sherrington ed. 1980), especially pages 136–139. Other examples of polymer-bound reagents are disclosed in Dixit, D. M. and Leznoff C. C., *Israel Journal of Chemistry* 1978, 17, 248; Frechet, J. M. J., *Tetrahedron* 1981, 37, 663; Crowley, J. I., and Rapoport, H., *Acc. Chem. Res.* 1976, 9, 135; Mohanraj, S., Ford, W. T., *J. Org. Chem.* 1985, 50, 1616; and Chiu, S. L. and Anderson L., *Carbohydrate Research* 1976, 50, 227. None of these references, however, disclose or suggest the present invention.

SUMMARY OF THE INVENTION

In one aspect, the present invention provides a trifluoroacetylthio- or trifluoroacetylthioalkyl-substituted divinyl benzene co-styrene polymer containing from 1 to about 20% by weight of polymerized divinyl benzene units and containing at least about 0.5 milliequivalents per gram of said polymer of a group —(CH$_2$)$_n$—S(CO)CF$_3$ on the phenyl rings of the polymerized styrene units thereof, wherein n is an integer of from 0 to 7. These polymers are non-odoriferous, liberate no smelly by-products and are fully recyclable. The polymers are insoluble in most, if not all, organic solvents and are microporous or macroporous resins which are swellable in organic solvents such as chloroform, dichloromethane, dioxane, dimethylformamide, benzene, alcohols, ethylacetate, acetic acid, etc. The polymers react with a large variety of unhindered primary and secondary amines, including phenylamine, substituted phenylamines, phenylalkylamines, substituted phenylalkylamines, alkylamines, dialkylamines, amino alkanols, amino acids, polypeptides, amino sugars, aminoglycosides, etc., to give upon simple physical separation, e.g., filtration, trifluoroacetamides in high yields with no racemization of chiral centers.

In another aspect, the present invention provides a process for the solid phase synthesis of N-substituted trifluoroacetamides which comprises the steps of reacting (1) a trifluoroacetylthio- or trifluoroacetylthioalkyl-substituted divinyl benzene co-styrene polymer containing from about 1 to about 20% by weight of polymerized divinyl benzene units and containing at least about 0.5 milliequivalents per dry gram of polymer of a group

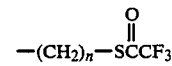

on the phenyl rings of the polymerized styrene units thereof, wherein n is 0 to 7, and (2) (a) an unhindered primary amine in which the carbon atom attached to the amine nitrogen either is a carbon atom of a phenyl ring or has at least one hydrogen bonded thereto or (b) an unhindered secondary amine in which one of the two carbon atoms attached to the amino nitrogen either is a carbon atom of a phenyl ring or has at least one hydrogen bonded thereto and the other carbon atom attached to the amino nitrogen has at least two hydrogens bonded thereto, to form a mixture of the N-substituted trifluoroacetamide and a trifluoroacetyl-depleted polymer; and recovering said N-substituted trifluoroacetamide from said mixture.

DETAILED DESCRIPTION

The following terms are intended to have the indicated meanings:

"Alkyl" (including the alkyl portion of "alkoxy") means a straight or branched chain hydrocarbon group having from 1 to 6 carbon atoms, including methyl, ethyl, n-propyl, isopropyl, n-butyl, isobutyl, n-pentyl, iso-pentyl, n-hexyl and iso-hexyl.

Substituted phenyl (including the substituted phenyl of substituted phenylalkyl) means a phenyl group substituted with 1 to 5 substituents each independently selecterd from halo, NO$_2$, alkyl or alkoxy.

Amino sugars are sugars having one or more amino groups thereon.

Aminoglycoside is intended to mean compounds having two or more amino sugars residues joined in glycosidic linkage to an aminocyclitol nucleus (usually streptidine or 2-deoxystreptamine). Thus, the term includes, for example, compounds of the neomycin family (e.g., neomycin B, paromomycin, ribostamycin and lividomycin), the kanamycin family (e.g., kanamycins A and B, amikacin, and tobramycin), the gentamicin family (e.g., gentamicins C$_1$, C$_{1a}$ and C$_2$, sisomicin and netilmicin) and streptomycin.

Polypeptide is intended to include compounds comprised of 2 or more amino acid units joined together by

(peptide) bonds. This term is thus intended to include proteins.

The polymer of the invention can be prepared by various techniques, e.g., by copolymerization of appropriate monomers or by chemical modification of a divinyl benzene co-styrene polymer, as generally discussed in Chapter 1 of *Polymer-supported Reactions in Organic Synthesis* cited above. In the copolymerization technique, appropriately substituted styrene monomers are copolymerized with divinyl benzene and optionally unsubstituted styrene monomers if it desired that not all of the phenyl rings of the polymerized styrene units have

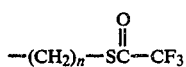

groups thereon. The appropriately substituted styrene monomer is of the formula

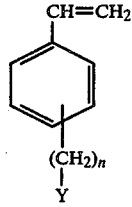

wherein Y is a group

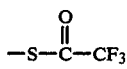

or a group which can be converted after polymerization to a group

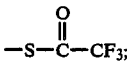

and n is 0–7.

For example, when n is 1–7, Y may represent Cl which may be converted after copolymerization to the group —SH. This may be accomplished by reaction with excess thiourea in, for example, refluxing 4-dioxane/ethanol to give the intermediate isothiouronium salt. The salt may be decomposed to the thiol (i.e., the phenyl ring contains a group —(CH₂)ₙ—SH) by treatment with benzyl amine, e.g., by the methods shown in Chiu et al., *Carbohydrate Research*, 1976, 50, 227. The —SH group may then be converted to the group

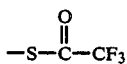

by reaction with trifluoroacetic anhydride.

When n is zero, the group Y may be, for example, halo, such as chloro. After copolymerization such a halo group may be lithiated (i.e., Li substitutes for the halo group). The lithiated polymer can be reacted with sulfur and acid such as HCl as described in Farrell et al., *J. Org. Chem.* 1976, 3877 to provide a polymer having a thiol (i.e., —SH groups directly attached to the phenyl rings of the styrene units) in place of the lithium. Again, this —SH group may be converted to

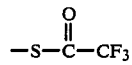

by reaction with trifluoroacetic anhydride.

The lithiated polymer described in the preceeding paragraph may also be reacted with a ω-dihaloalkane Y—(CH₂)ₘ—Y (wherein each Y represents a halo group which may be the same or different and m is 1 to 7) such as dibromomethane, 2-bromoethane, 1,4-dibromobutane, etc., to produce a group —(CH₂)ₘ—Y on the phenyl rings of the substituted styrene units. The halo may then be converted to —SH and then to

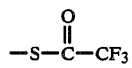

as described above.

In the chemical modification technique, a divinyl benzene co-styrene polymer is treated with a reagent to provide a substituent group (such as halo, halomethyl or lithium) on some or all of the phenyl rings of polymerized styrene units thereof, which substituent group can be converted into the desired

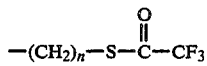

group. For example, a divinyl benzene co-styrene polymer can be (1) chloromethylated in a Friedel-Crafts reaction with chloromethyl methyl ether and stannic chloride and such chloromethylated polymers are commercially available from Bio-Rad Co. as Bio-Beads S—X1, chloromethyl, having a dry mesh size of 200–400 and either a low capacity of 1.25 meq./dry gram of polymer or a high capacity of 4.25 meq./dry gram of polymer; (2) halogenated by reaction with halogen such as, bromine, in the presence of, for example, ferric chloride as a catalyst (see, for example, Farrell, M. J. and Frechet, J. M. J., *J. Org. Chem.*, 1976, 41, 3877); or (3) lithiated by reaction of the halogenated divinyl benzene co-styrene polymer of (2) above with excess of a lithiating agent, e.g., an alkyl lithium such as n-butyl-lithium or by direct reaction of a divinyl benzene co-styrene polymer with a lithiating agent, for example, a complex of n-butyl lithium and N,N,N',N'-tetramethyl ethylenediamine (see, for example, the Farrell et al. article mentioned in (2) above).

The chloromethylated, halogenated or lithiated divinyl benzene co-styrene polymers can then be converted into the trifluoroacetylthio- or trifluroacetylthioalkyl-substituted polymer of the invention. For example, the halogenated polymer can be lithiated (i.e., Li substituting for the halo group). As described above, the lithiated polymer can be reacted with sulfur and acid or with a compound Y—(CH₂)ₘ—Y wherein m is 1 to 7 each Y represents a halo group which may be the same or different to provide either a —SH or —(CH₂)ₘ—Y group, respectively, on some or all of the phenyl rings of the styrene units in the polymer. The halo of the group —(CH₂)ₘ—Y (including the chloromethyl group of the chloromethylated polymer) may be converted to —SH by reaction with thiourea as discussed above. The —SH group is then converted to the group number of such phenyl rings so substituted can be varied as is conventional in the art.

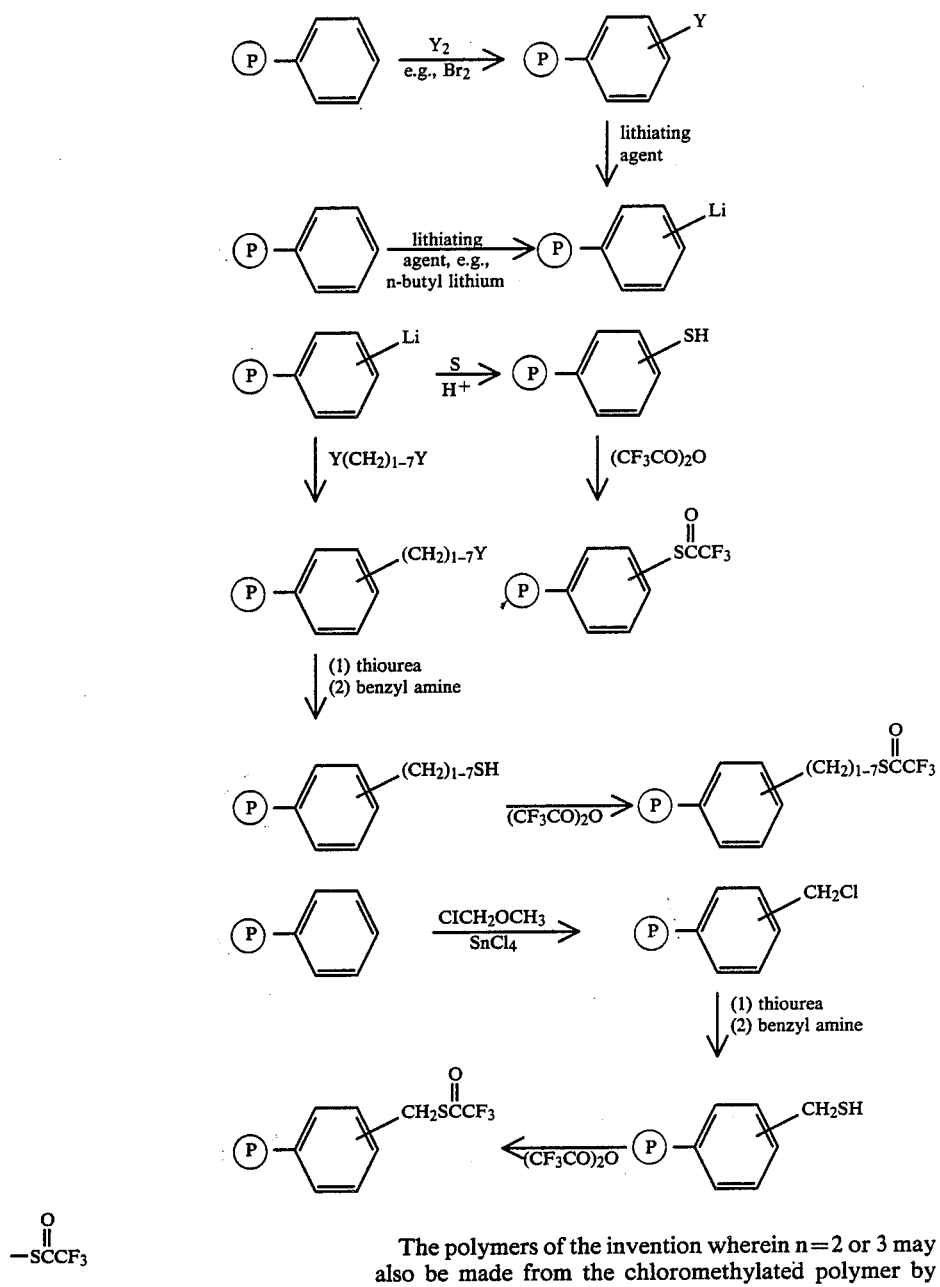

Examples of these chemical modification reactions are illustrated below. In these illustrations the symbol

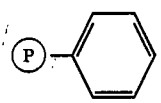

is used to represent the divinyl benzene co-styrene polymeric substrate with the phenyl ring being representative of the phenyl rings of the polymerized styrene units in the polymer. Depending on the relative amounts of materials employed and the reaction conditions, the $$-\overset{O}{\underset{\|}{S}}CCF_3$$

by treatment with, for example, trifluoroacetic anhydride.

The polymers of the invention wherein n=2 or 3 may also be made from the chloromethylated polymer by first converting the latter polymer into the corresponding $(CH_2)_{2\text{-}3}Br$ substituted polymer by the reactions disclosed in, for example, Chiles, M. S. and Reeves, P. C., Tetrahedron letters, 1979, 3367. The Br may be then converted to —SH and to $$-S-\overset{O}{\underset{\|}{C}}-CF_3$$

as discussed above.

The reaction of the thiol- or thiolalkyl-substituted (i.e., —(CH$_2$)$_n$SH) polymer with the trifluoroacetic anhydride can be carried out, for example, at a temperature of about 0° C.–50° C. in an anhydrous inert medium such as dry dioxane, tetrahydrofuran (THF) or ether, and preferably in an inert atmosphere such as argon or nitrogen to prevent moisture intrusion. The mixture may be cooled and filtered and the separated polymer washed with dry dioxane, anhydrous ethanol, anhydrous tetrahydrofuran and/or anhydrous ether, and dried in a high vacuum at about 50°–60° C. for about 3–5 hours.

The polymer of the invention contains from about 1 to about 20% by weight of polymerized divinyl benzene. The amount of divinyl benzene and the molecular weight of the polymer should be sufficient so that the resulting polymer of the invention is insoluble in the solvent in which the desired reaction is to be run, i.e., so that the polymer of the invention remains in the solid phase. Preferably, the polymer of the invention contains from about 1 to about 8% by weight of the polymerized divinyl benzene.

The polymer of the invention contains at least about 0.5 milliequivalents of the group

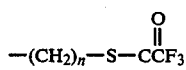

per dry gram of the polymer on the phenyl rings of the styrene units thereof. The polymer may contain a

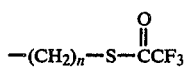

group on each such phenyl ring. Preferably, the polymer contains from about 0.8 to about 4 milliequivalents of the group

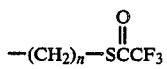

per dry gram of the polymer.

In a preferred embodiment of the invention, the polymer is a trifluoroacetylthiomethyl-substituted material, i.e., having

substituent groups on some or all of the phenyl rings of the polymerized styrene units of the polymer. Preferably, such trifluoroacetylthiomethyl groups are present in an amount of from about 0.8 to about 4 meq. per dry gram of the polymer.

The trifluoroacetylthio- or trifluoroacetylthioalkyl-substituted divinyl benzene co-styrene polymer is an advantageous reagent for organic synthesis. It provides a simple method for producing N-trifluoroacetamides in high yield, with no racemization of chiral centers, with no production of disagreeable odors, and with easy isolation of the N-substituted trifluoroacetamide product by simple filtration and solvent evaporation of the filtrate. This reaction can also be conducted on a column containing the polymer of the invention without filtration.

Thus, the polymer of the invention may be reacted with an unhindered primary or secondary amine. Suitable amines include (a) an unhindered primary amine in which the carbon atom attached to the amino nitrogen either is a carbon atom of a phenyl ring or has at least one hydrogen bonded thereto or (b) an unhindered secondary amine in which one of the two carbon atoms attached to the amino nitrogen either is a carbon atom of a phenyl ring or has at least one hydrogen bonded thereto and the other carbon atom attached to the amino nitrogen has at least two hydrogens bonded thereto. Examples of simple amines include phenylamine, substituted phenyl amines, phenylalkylamines, substituted phenylalkylamines, alkylamines, dialkylamines, and amino acids such as those of the formula $HNRR^1$ wherein R is hydrogen or a lower straight or branched chain alkyl group in which the carbon attached to the nitrogen has at least two hydrogens; and $R^1$ is a lower straight or branched chain alkyl group in which the carbon attached to the nitrogen has at least one hydrogen, which alkyl group may optionally be substituted with a carboxyl or a hydroxyl group; a phenyl group; substituted phenyl group; a phenylalkyl group; or a substituted phenylalkyl group. Suitable amino acids include the alpha-, beta-, gamma- and delta-amino acids, amino acids containing more than one carboxyl group and/or more than one amino group, and heterocyclic amino acids including, for example, imidazolyl, indolyl, or pyrrolidinyl groups. Examples of suitable amino acids include glycine, glycin, alanine, beta-alanine, valine, leucine, isovaline, isoleucine, phenylalanine, lysine, threonine, tyrosine, serine, cysteine, cystein, methionine, aspartic acid, glutamine, glutamic acid, arginine, lysine, ornithine, asparagine, histidine, tryptophan, proline, etc. More complex amines include polypeptides, amino sugars and aminoglycosides. The polymers of the invention are particularly useful in reactions with amino acids to protect the amino groups thereof in peptide synthesis.

The reaction with amines is illustrated below with reference to compounds of the formula $HNRR^1$ but any unhindered primary or secondary amine may be employed, such as a polypeptide, amino sugar or aminoglycoside:

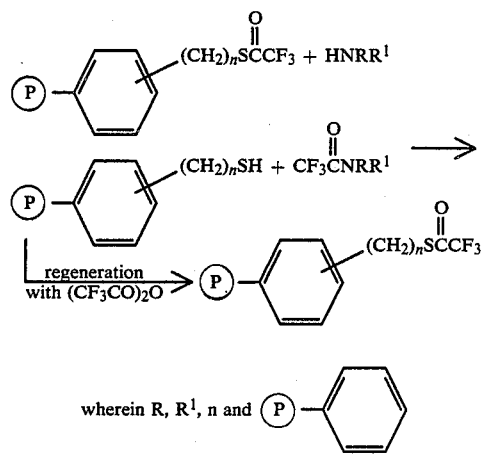

wherein R, $R^1$, n and (P)— are as defined above.

The reaction with the amine compounds is normally conducted in an inert solvent, preferably anhydrous, such as dry dioxane, anhydrous THF, etc. The reaction temperature may vary, e.g., from room temperature to about 85° C. or up to the reflux temperature of the inert solvent. Preferably, the reaction is run under an atmosphere of an inert gas such as nitrogen or argon to prevent moisture intrusion. The polymer of the invention may be employed in varying amounts, preferably in amounts such that the group

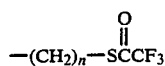

is available in equivalent amounts or in excess relative to the amine.

Upon completion of the reaction with the amine, a mixture is obtained which contains the N-trifluoroacetamide and polymer from which some or all of the trifluoroacetyl groups have been depleted. Because the polymer is in the solid phase, the mixture can be easily separated by simple filtration or by any other conventional means for separating solids from liquid. The N-trifluoroacetamide is recovered from the liquid phase (i.e., from the inert solvent) by any conventional means, e.g., evaporation of solvent and recrystallization or other conventional purification of the N-trifluoroacetamide recovered. For example, the recovered trifluoroacetamide may be purified by dissolving it in methylene chloride, ether, or ethyl acetate; washing with 5% HCl and cool brine; and drying over magnesium sulfate, to give high yields of pure trifluoroacetamide.

The trifluoroacetyl-depleted polymer can be regenerated simply by treatment of such depleted polymer with trifluoroacetic anhydride. By employing excess trifluoroacetic anhydride, the regenerated polymer of the invention provides essentially identical capacity and reactivity as freshly prepared trifluoroacetylthio- or trifluoroacetylthioalkyl-substituted divinyl benzene co-styrene polymer.

The following examples are intended to illustrate, but not to limit, the present invention.

EXAMPLE 1

Preparation of trifluorothioacetylthiomethyl-substituted divinyl benzene co-styrene polymer Chloromethylated polymer (1.25 meq. of Cl/g of polymer) [Bio-Beads S—X1, chloromethyl, mesh size 200–400 from Bio-Rad Co.] was treated with thiourea in dioxane:ethanol (1:4) at 95<C. for 20 hours to convert the chloro group thereof to the group

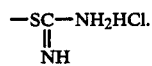

The isothiouronium group was cleaved with benzyl chloride in methoxyethanol by refluxing for 4 hours to provide a thiolmethylated polymer, i.e., having —CH$_2$SH groups on the phenyl rings of the polymerized styrene units in place of CH$_2$Cl. The IR-spectrum of the resin showed —SH absorption at 2560 cm$^{-1}$.

Trifluoroacetic anhydride (20 ml) was added to a suspension of 93 g of the thiolmethylated polymer in 650 ml of dry dioxane at 0<C., under an argon atmosphere. The mixture was then stirred for 0.5 hours at 0<C., for 18 hours at room temperature and for 2 hours at 45–50<C. (bath temperature). The cooled mixture was then filtered. The separated polymer was washed twice with dry dioxane, three to six times with anhydrous ethanol, three to four times with anhydrous tetrahydrofuran (THF) and five to six times with anhydrous ether until the pH of an aqueous extract of the filtrate was about 7 to give trifluoroacetylthiomethyl-substituted polymer (hereinafter polymer A). Polymer A was dried in a high vacuum at 50–60<C. for 3–5 hours. The minimum capacity of polymer A produced was 0.86 mmol/g as determined by its use in a N-trifluoroacetylation reaction with benzylamine, using excess amine. The infrared spectrum of polymer A exhibited characteristic absorptions at 1720 and 1740 cm$^{-1}$. Polymer A can be stored at room temperature for several months without diminution of capacity or the liberation of disagreeable odors.

EXAMPLE 2

Preparation of N-substituted trifluoroacetamides (Procedure 1 using an excess amount of amine)

In a typical procedure, a suspension of 3.0 g (2.7 mmol) of polymer A in 25 ml of dry dioxane was added to 0.75 g (7 mmol) of benzylamine. The mixture was refluxed under an argon atmosphere for 3 hours, cooled to room temperature and filtered.

The recovered trifluoroacetyl-depleted polymer was washed twice with 10 ml of dioxane, three times with 10 ml of ethanol, four times each with 10–15 ml of dichloromethane and ether and finally dried. The IR spectrum of the recovered trifluoroacetyl-depleted polymer exhibited a weak absorbance at 2560 cm$^{-1}$ (SH) and the carbonyl absorbance characteristic of the trifluoroacetylthio group disappeared.

Polymer A was generated by treating the depleted polymer with excess trifluoroacetic anhydride. The regenerated polymer A reagent maintains the identical capacity and reactivity as the freshly prepared polymer A.

The filtrate was evaporated to dryness. The crude product was dissolved in methylene chloride, ether, or ethyl acetate, washed with cool 5% HCl, cool brine and dried over magnesium sulfate. The solvent was evaporated and 0.6 g of crude N-benzyl 2,2,2-trifluoroacetamide was recovered. Flash chromatography of the residue using methylene chloride as eluant gave an 86% yield or 0.54 g of pure N-benzyl 2,2,2,-trifluoroacetamide having a melting point of 75°–76° C. From the yield of the acetamide it is calculated that polymer A has a loading capacity of 0.86 mmol of 2,2,2-trifluorothioacetylmethyl groups/g of dry polymer.

By similarly reacting regenerated polymer A with 3-amino-1-propanol, phenyl amine, n-hexylamine and isopropyl amine, the acetamides N-3-hydroxypropyl 2,2,2-trifluoroacetamide, N-phenyl 2,2,2-trifluoroacetamide, N-hexyl 2,2,2-trifluoroacetamide and N-isopropyl 2,2,2-trifluoroacetamide, respectively, were prepared in yields of 90%, 80%, 90% and 86%, respectively.

EXAMPLE 3

Preparation of N-trifluoroacetyl valine

Using the procedure as basically described in Example 2, an equivalent amount of L-valine was reacted with regenerated polymer A in an anhydrous methanol solvent at room temperature for 72 hours. The resin was filtered and washed and the filtrate was worked up as described in Example 2 to give an 80% yield of pure CF$_3$CONHCH(CO$_2$H)CH(CH$_3$)$_2$ having a m.p. of 87°–88° C.

EXAMPLE 4

Preparation of N-substituted trifluoroacetamides (Procedure 2-using an excess amount of polymer A)

Polymer A (6 g, 5.3 mmol, a 2x excess) and 0.24 g (3 mmol) of 2-amino-1-propanol was refluxed in a dioxane solvent under argon for 3 hours and worked up with ethyl acetate as described above in Example 2. After distillation, a 90% yield (0.45 g) of N-(2-hydroxy-1-methylethyl)-2,2,2-trifluoroacetamide was obtained having a b.p. of 100°–102°/1.2 mm, mp 80°–81° C., $[\alpha]_D^{22} = -15.3°$ (C=4.5, C$_2$H$_5$OH).

By basically the same procedure of Example 4, phenyl amine, benzyl amine, hexyl amine, isopropyl amine, and L-alanine were reacted with Polymer A to provide the corresponding 2,2,2-trifluoroacetyl derivatives thereof in yields of 80%, 91%, 93%, 90% and 90%, respectively. No racemization of the L-alanine occurred.

While the present invention has been described in conjunction with the specific embodiments set forth above, many alternatives, modifications and variations thereof will be apparent to those of ordinary skill in the art. All such alternatives, modifications and variations are intended to fall within the spirit and scope of the present invention.

I claim:

1. A process for the solid phase synthesis of N-substituted trifluoroacetamides which comprises the steps of reacting (1) a trifluoroacetylthio- or trifluoroacetylthioalkyl-substituted divinyl benzene costyrene polymer containing from about 1 to about 20% by weight of polymerized divinyl units and containing at least about 0.5 milliequivalents per dry gram of polymer of a group

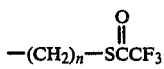

on the phenyl rings of the polymerized styrene units thereof, wherein n is 0 to 7, and (2) a primary or secondary amine selected from phenylamine, a phenylalkylamine, an alkylamine, a dialkylamine, an aminoalkanol, an amino acid, a polypeptide, an aminoglycoside, a substituted phenylamine or a substituted phenylalkylamine, said substituted phenylamine or substituted phenylamine or substituted phenylalkylamine being substituted with from 1 to 5 groups each independently selected from halo, NO$_2$ alkyl or alkoxy, (a) said unhindered primary amine being an unhindered primary amine in which the carbon atom attached to the amino nitrogen either is a carbon atom of a phenyl ring or has at least one hydrogen bonded thereto or (b) said unhindered secondary amine being an unhindered secondary amine in which one of the two carbon atoms attached to the amino nitrogen either is a carbon atom of a phenyl ring or has at least one hydrogen bonded thereto and the other carbon atom attached to the amino nitrogen has at least two hydrogens bonded thereto, to form a mixture of the N-substituted trifluoroacetamide of the amine and a trifluoroacetyl-depleted polymer; and recovering said N-substituted trifluoroacetamide from said mixture.

2. A process according to claim 1 wherein in the trifluoroacetylthioalkyl-substituted divinyl benzene co-styrene polymer n is 1.

3. A process according to claim 1 wherein the trifluoroacetylthio- or trifluoroacetylthioalkyl-substituted divinyl benzene co-styrene polymer contains from about 0.8 to about 4 milliequivalents of the group —(CH$_2$)$_n$—S(CO)CF$_3$ per dry gram of such polymer.

4. A process according to claim 1 wherein the said trifluoroacetyl-depleted polymer is separated from the mixture and is treated with trifluoroacetic anhydride to regenerate the trifluoroacetylthio- or trifluoroacetylthioalkyl-substituted divinyl benzene co-styrene polymer.

5. A process in according to claim 1 wherein the unhindered primary or secondary amine is an amino acid.

6. A process according to claim 1 where the unhindered primary amine is a polypeptide.

7. A process according to claim 1 wherein the reaction is performed with an excess amount of the trifluoroacetylthio- or trifluoroacetylthioalkyl-substituted divinyl benzene co-styrene polymer.

8. A process according to claim 1 wherein the trifluoroacetylthio- or trifluoroacetylthioalkyl-substituted divinyl benzene co-styrene polymer is suspended in dry dioxane and reacted with said amine under an inert gas atmosphere.

9. A process according to claim 1 wherein the trifluoroacetyl-depleted polymer is removed from the mixture by filtration.

10. A process according to claim 9, wherein the trifluoroacetylthio- or trifluoroacetylthioalkyl-substituted polymer is regenerated by treatment of the trifluoroacetyl-depleted polymer with trifluoroacetic anhydride.

* * * * *